June 18, 1946. L. L. SALFISBERG 2,402,298
SEALING AND CRIMPING MACHINE
Filed Aug. 23, 1944 2 Sheets-Sheet 1

Inventor
Leroy L. Salfisberg,
By
Harry R. Cook,
Attorney

June 18, 1946.  L. L. SALFISBERG  2,402,298

SEALING AND CRIMPING MACHINE

Filed Aug. 23, 1944  2 Sheets-Sheet 2

Inventor
Leroy L. Salfisberg,
By Harry B. Cook,
Attorney

Patented June 18, 1946

2,402,298

UNITED STATES PATENT OFFICE 2,402,298

SEALING AND CRIMPING MACHINE

Leroy Lincoln Salfisberg, South Orange, N. J.

Application August 23, 1944, Serial No. 550,753

20 Claims. (Cl. 154—42)

This invention relates in general to a machine for pressing one or more layers of material into tight contact with another, and more particularly the invention contemplates mechanism for sealing together layers of packaging material for making or closing packages, or for attaching labels or covers to packages.

A machine of this general character is described in my United States Patent No. 2,140,117 dated December 13, 1938, and includes a pair of jaws to receive and press layers of material between them, at least one jaw being initially actuated toward the other by the operator through a treadle-operated mechanism which starts a motor driven cam which then continues actuation of the movable jaw, until the treadle-operated mechanism is released, whereupon the cam will come to rest at the end of a revolution.

One object of the present invention is to provide a novel and improved machine of the general character described wherein as great or greater pressure than that supplied by an electric motor can be applied to the jaws wholly manually and with no more effort on the part of the operator than is required to operate the machine described in my aforesaid patent, whereby results equal to or better than those heretofore possible with the above described motor-operated machine can be obtained as rapidly and with greater economy in use of power.

Another object is to provide such a machine which shall include novel and improved hydraulic mechanism for applying high sealing pressure to the jaws, and novel and improved manually operated means for generating the required hydraulic pressure, whereby it shall be possible to obtain high pressure with a minimum expenditure of energy by the operator.

Further objects are to provide a machine of the general character described which shall include novel and improved simple means whereby the high pressure may be varied in accordance with the requirements of different pressing or sealing operations; and to provide in such a machine novel and improved means whereby the period of application of pressure by the jaws easily can be predetermined and varied to accommodate different conditions and kinds of materials to be operated upon.

Other objects are to provide such a machine which shall include novel and improved features of construction whereby the possibility of injury of the operator's fingers between the jaws of the machine shall be reduced to the minimum; to provide a machine for pressing or sealing layers of sheet material together which shall be simple, inexpensive, and reliable in construction and operation; and to obtain other advantages and results that will be brought out by the following description in conjunction with the accompanying drawings in which Figure 1 is a front elevational view of the machine constructed in accordance with the invention.

Figure 1:
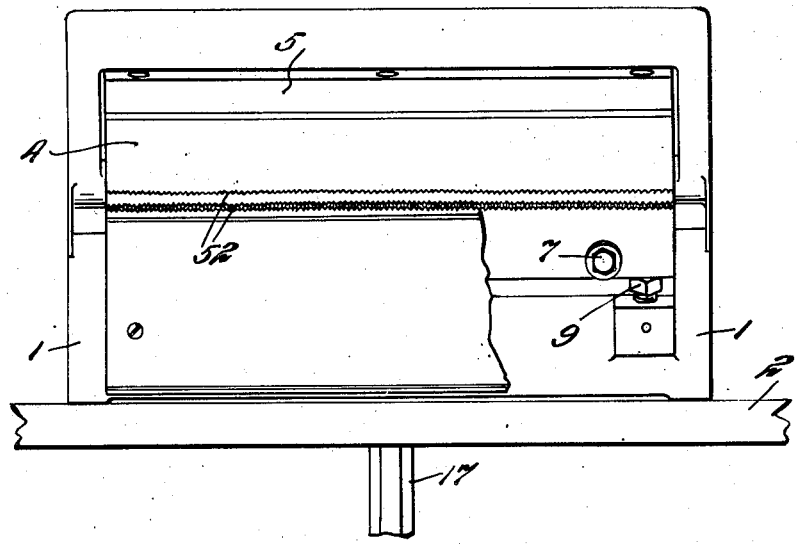
Figure 2:
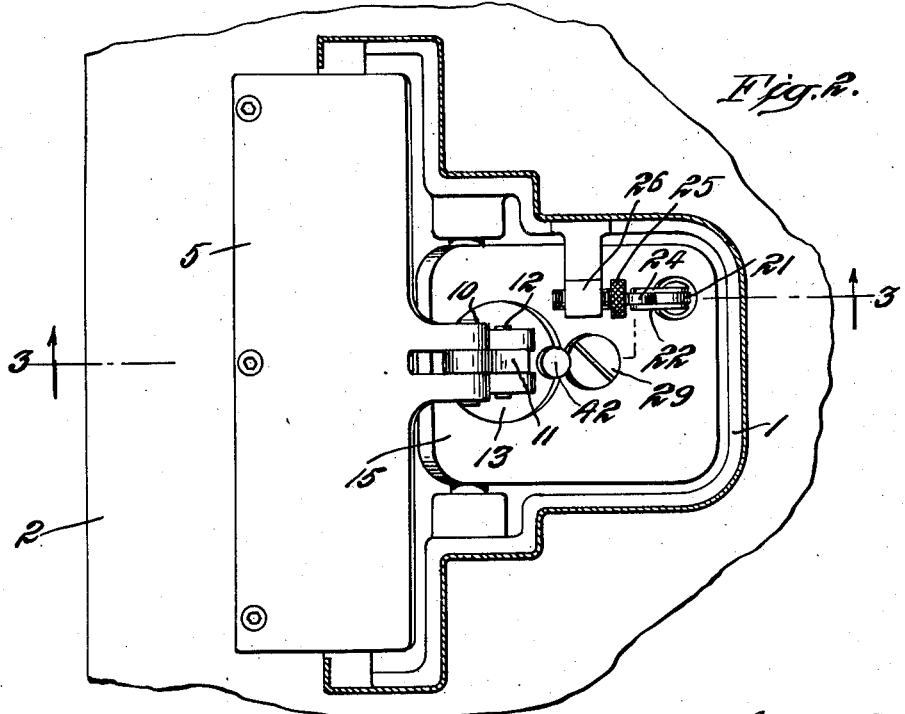
Figure 2 is a top plan view thereof with a portion of the casing broken away for clearness in illustration.

Specifically describing the invention, the reference character 1 designates the frame of the machine which may be a casting and is constructed to be set and fastened upon a table or like support 2. At the front of the frame is mounted a stationary jaw 3 which is shown in the form of an elongate bar of metal mounted on the frame for adjustment relatively to a movable jaw 4 which also constitutes an elongate metal bar and is mounted on a lever or yoke 5 which is mounted to oscillate about a horizontal axis between its ends on the frame 1 so as to move the jaw 4 toward and from the jaw 3. As shown, the lever 5 is mounted on the shaft 6 which is in turn mounted in the frame 1.

Preferably the jaw 3 is mounted on the frame by cap screws 7 which pass loosely through slots 8 in the jaw and clamp the jaw between the heads of the screws and the frame 1, the slots permitting adjustment of the jaw toward and from, the movable jaw 4. To facilitate such adjustment, preferably the jaw 3 normally rests upon abutment screws 9 which are threaded into the frame, so that by loosening the cap screws 7 and rotating the screws 9, accurate adjustments of the jaw can be easily made.

In accordance with the invention the movable jaw 4 is actuated by manually operated hydraulic mechanism and as shown, the end of the lever 5 opposite the jaw 4 is pivotally connected at 10 to one end of a toggle link 11, the other end of which is pivotally connected at 12 to one end of a piston 13 which is reciprocable within a cylinder 14 that is formed in a block 15 which in turn is mounted on a shaft 16 in the frame 1 to oscillate about a horizontal axis. Depending from the shaft 16 is a treadle arm 17 at the lower end of which is a suitable treadle preferably in the form of a stirrup 18.

Also mounted in the block 15 is a smaller pump piston 19 which normally is influenced upwardly by a compression spring 20 and engages at its upper end a roller 21 which is mounted on one arm of a three-armed lever 22 one of the other arms of which is pivotally connected at 23 to the top of the block while the other arm carries a roller 24 which bears against an abutment screw 25 that is adjustably mounted in the bracket arm 26 on the frame 1.

Figure 3:
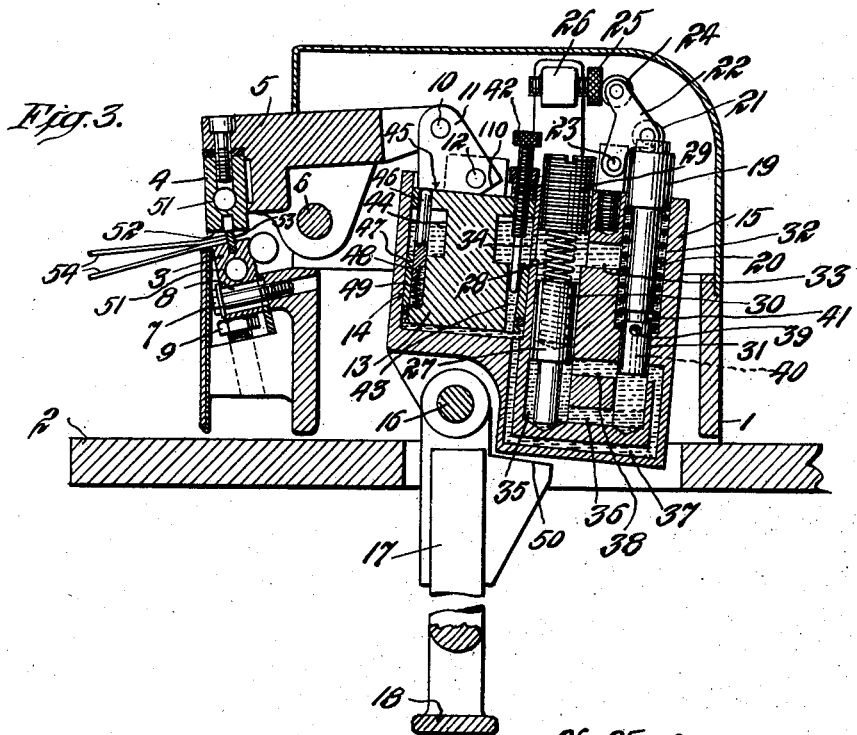
Figure 3 is a transverse vertical sectional view on the line 3—3 of Figure 2, showing the machine at rest.
Figure 4:
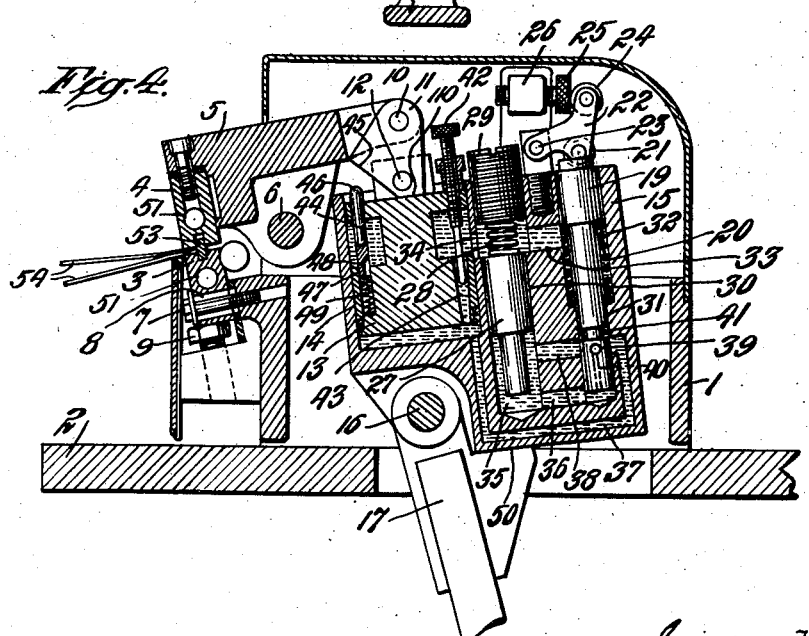
Figure 4 is a similar view of the machine during a pressing or sealing operation.

The parts as so far described are so related that normally the pressure of the spring 20 acting on the lever 22 tilts the block 15 into the position shown in Figure 3 so as to hold the jaw 4 in spaced relation to the jaw 3; and when the treadle arm 17 is pushed rearwardly the block is tilted forwardly so as to swing the toggle link 11 and actuate the lever 5 to force the jaw 4 into engagement with the jaw 3 as shown in Figure 4.

Preferably the treadle 17 may swing on the shaft 16 independently of the block 15 and normally depends from the shaft by action of gravity as shown in Figure 3, the treadle arm having a lug 50 to abuttingly underlie the block 15 as the treadle is swung to the right in Figure 3 so as to move the block with the treadle as shown in Figure 4. With such construction the operator may simply push the treadle away from him to swing the block 15 into jaw-closing position and immediately allow the treadle to swing backwardly into its initial position, the block being held in jaw-closing position by the pressure acting on the toggle link 11 and lever 5 as hereinafter described.

After the jaw 4 has been moved into engagement with the jaw 3 as above described, high pressure is exerted on the jaw 4 by hydraulic mechanism the hydraulic pressure for which is generated by the movement of the treadle arm in the direction to close the jaws.

In addition to the pistons 13 and 19, this hydraulic mechanism includes a power piston 27 the upper end of which is engaged by a compression spring 28 which is interposed between said piston and a screw plug 29 which is fitted in the end of the cylinder 30 in which said piston is reciprocable.

The cylinder 31 in which the pump piston 19 is mounted is enlarged intermediate its ends to form a chamber 32 which communicates with the cylinder 30 by a port 33, and the cylinder 14 of the piston 13 communicates with the cylinder 30 through a port 34. The lower end of the power piston 27 is reduced to form a chamber 35 in the cylinder, and said chamber is connected by a port 36 to the cylinder of the piston 19 below said piston. Another duct 38 connects the chamber 35 with the chamber beneath the valve piston 19 and also communicates through a passage 37 with the bottom of the cylinder 14 of the actuating piston 13. The piston 19 also has a transverse port 39 and a longitudinal duct 40 normally to establish communication between the chamber 32 and the space beneath the piston 19. Above the port 39 the valve piston has a circumferential groove 41.

Normally the parts are in the position shown in Figure 3, but when the treadle arm 17 is swung to the right in Figure 3, the block 15 is swung until the pivots 10 and 12 are disposed substantially in a common axial plane of the piston 13 and a shoulder 110 on the link 11 abuts the end of said piston to limit said swinging movement. At the same time the pump piston 19 is pushed downwardly so as to close the ports 39, the duct 40 and the duct 38, and the fluid trapped under the piston 19 forces the power piston 27 upwardly against the influence of the spring 28 to store up power in said spring, the piston 19 also serving as a valve to cut off the duct 38 and chamber 35 from the passage 37. When the groove 41 communicates with the duct 38 the fluid under the pressure of the spring 28 will be forced from the chamber 35, duct 38, groove 41 and passage 37 to the cylinder 14 beneath the piston 13 so as to move said operating piston 13 upwardly against the resistance of the jaws which are in contact with each other or in contact with material that is between them.

It will be seen that in view of the relative sizes of the pistons in the hydraulic mechanism, the pressure thus exerted on the jaw 4 is a high pressure, for example 600 pounds per square inch, and that said pressure is generated by the simple manual movement of the treadle 18 which requires only small effort on the part of the operator.

This high pressure will be maintained on the jaws for a period of time which is predetermined by the needle valve 42 which is screw threaded in the piston 13 and controls a valve passage 43 which communicates between the space at the bottom of the cylinder 14 and a chamber 44 intermediate the ends of the piston. The fluid under pressure will escape past the valve 42 slowly or fast depending upon the position of the valve in the passage 43, the escaping fluid entering the cylinder 30 above the pressure piston 27 as well as the chamber 32 around the valve piston 19. From the foregoing, it will be observed that the length of the period during which the pressure is maintained on the jaws may be predetermined and varied by the valve 42 to accommodate different conditions and different kinds of material to be operated upon.

It will be seen that the pressure is maintained by the movement of the pressure piston 27 under the influence of the spring 28 and when said piston has moved to its lower limit as shown in Figure 3, the pressure on the operating piston 13 is released so that the latter may recede into its cylinder under the influence of the pressure of the spring 20 which pushes the piston 19 upwardly against the lever 22 and rocks the block 15 backwardly into its initial position as shown in Figure 3. This upward movement of the piston 19 creates a vacuum in the chamber beneath the piston which draws fluid through the port 39 and duct 40 from the chamber 32 when the port 39 communicates with said chamber, whereupon all of the parts are restored to their initial and normal positions and all hydraulic pressure is released. Backward tilting of the block 15 is limited by a shoulder 45 on the toggle link 11 which engages the top of the cylinder 13.

In order to reduce noise in the operation, a small piston 46 is loosely slidably mounted in a cylinder 47 in the piston 13 which communicates with the chamber 44, the inner end of the piston being cut away at 48 and the outer end of the piston extending through the top of the operating piston 13. A spring 49 normally influences the piston 46 upwardly to permit fluid to flow through the cut-away portion 48 into the cylinder 47 and to project the end of the piston 46 beyond the top of the piston 13 as shown in Figure 4. When the toggle link 11 hits the piston 46 the liquid in the cylinder 47 is initially forced outwardly from the cylinder rapidly but when the cut-away portion 48 enters the cylinder the flow of liquid around the piston is retarded so as to permit gradual movement of the toggle link into contact with the top of the piston 13 and thereby reduce the noise which would be incident to a snap action.

It will be observed that the machine reduces to the minimum the possibility of injury to the operator. While the hydraulic mechanism applies high pressures to the jaws, it is impossible for the operator's fingers to be inserted between the jaws during the application of the high pressure because upon the initial movement of the treadle and before the hydraulic pressure is generated, the jaws are closed, and only the relatively light pressure exerted by the foot of the operator is applied to the jaws. Moreover, this portion of the movement of the jaws is entirely under the control of the operator and can be stopped any time before the toggle link 11 reaches position for application of hydraulic pressure.

In accordance with the invention, means is also provided for varying the pressure exerted by the hydraulic mechanism on the jaws, and as shown, this means comprises the screw 29 for adjusting the compression of the spring 28. Obviously, by increasing and decreasing the pressure of this spring, the pressure exerted on the jaws by the hydraulic mechanism will be increased and decreased respectively. It is also possible to obtain further variation in the pressure by substituting lighter or heavier springs for the spring 28.

In this way the pressure may be predetermined and varied in accordance with the requirements of different pressing and sealing operations.

It is also desirable to provide means for adjusting the movement of the valve piston 19 so as to ensure that the groove 41 shall properly register with the duct 38 when the toggle link 11 has been moved into its vertical position for causing engagement of the jaws 3 and 4, and this adjustment is made possible by movement of the screw 25 in its bracket 26.

In some cases it may be desired to heat the jaws 3 and 4 and for this purpose the jaws may have openings 51 to receive electric heaters in known manner.

Also the jaws may be formed with corrugations or serrations 52 for crimping the layers of material that are pressed between the jaws, and it is desirable to have a suitable shoulder or gauge 53 on the lower jaw to guide and limit the insertion of the layers of material, which are generally indicated 54, into the spaces between the jaws.

Those skilled in the art will readily understand that the machine may be utilized for work upon sheet material of different characters but it is especially adapted for sealing together layers of packaging material for making or closing packages or for attaching labels or covers to packages.

While I have shown the preferred form of the invention as embodied in certain details of construction it should be understood that many modifications and changes in the construction of the invention may be made within the spirit and scope of the invention.

What I claim is:

1. A machine of the character described comprising relatively movable jaws to receive material between them to be pressed, a hydraulic unit including a pressure generating mechanism and means for applying hydraulic pressure to said jaws, said unit being mounted for movement relatively to said jaws, an operating element and means mechanically connecting said hydraulic unit, said operating element and said jaws such that upon movement of said operating element in one direction said hydraulic unit is moved and serves as a link for causing closing of said jaws under influence of said operating element, and means cooperating with said pressure generating mechanism during such movement of said unit for producing hydraulic pressure and for controlling application and release of said pressure to and from said pressure applying mechanism to continue closing of said jaws under said pressure, and means for moving said unit in the other direction upon release of said pressure to open said jaws.

2. A machine of the character described comprising relatively movable jaws to receive material between them to be pressed, a hydraulic unit including a pressure generating mechanism and means for applying hydraulic pressure to said jaws, said unit being mounted for movement relatively to said jaws, an operating element and means mechanically connecting said hydraulic unit, said operating element and said jaws such that upon movement of said operating element in one direction said hydraulic unit is moved and serves as a link for causing closing of said jaws under influence of said operating element, stationary means cooperating with said pressure generating means to actuate the latter and generate hydraulic pressure during such movement of said unit, means for controlling application and release of said pressure to and from said pressure applying mechanism to continue closing of said jaws under said pressure, and means for moving said unit in the other direction upon release of said pressure to open said jaws.

3. A machine of the character described comprising relatively movable jaws to receive material between them to be pressed, and means for closing and opening said jaws including a manually operable element, hydraulic mechanism including a movable block, means including a pump mounted in said block to generate and store hydraulic pressure, an operating piston in said block actuated by said pressure and a valve and passages in said block to control flow of liquid to and from said operating piston, an operative connection between said piston and said jaws, and means including an operative connection between said block and said manually operable element for moving said block to actuate said pump.

4. The machine set forth in claim 3 with the addition of means for predetermining the pressure applied to said operating piston.

5. The machine set forth in claim 3 with the addition of means for predetermining the duration of the period of application of said pressure to said operating piston.

6. A machine of the character described comprising relatively movable jaws to receive material between them to be pressed, and means for closing and opening said jaws including a manually operable element, and an operative connection between said manually operable element and said jaws which comprises a hydraulic mechanism including a means connected to said manually operable element and actuated thereby to produce hydraulic pressure, means actuated by said pressure and operatively connected to one of said jaws, there being an operative connection between the last-named means and said manually operable element such that movement of said manually operable element in one direction first initiates closing of said jaws and hydraulic pressure is generated by and during continued movement of said element in said direction and is applied to said jaws to close them by hydraulic pressure.

7. The machine set forth in claim 6 with the addition of means for predetermining the duration of application of said pressure to said jaws.

8. A machine of the character described comprising relatively movable jaws to receive material between them to be pressed, and means for closing and opening said jaws including a block mounted to move relatively to said jaws and having a cylinder therein, an operating piston reciprocable in said cylinder and operatively connected to said jaws, said block having a second cylinder therein, a pump piston in said second cylinder, a spring for actuating said pump piston in one direction, an operative connection between said pump piston and a fixed abutment such that movement of said block in opposite directions will cause reciprocation of said pump piston to generate hydraulic pressure upon movement of the piston in one direction, a manually operable element for moving said block in one direction to move said pump piston against the influence of said spring and generate hydraulic pressure, and means including passages in said block and said pump piston to control application and release of said hydraulic pressure to and from said operating piston respectively.

9. A machine of the character described comprising relatively movable jaws to receive material between them to be pressed, and means for closing and opening said jaws including a block mounted to move relatively to said jaws and having a cylinder therein, an operating piston reciprocable in said cylinder and operatively connected to said jaws, said block having a second cylinder therein, a pump piston in said second cylinder, a spring for actuating said pump piston in one direction, an operative connection between said pump piston and a fixed abutment such that movement of said block in opposite directions will cause reciprocation of said pump piston to generate hydraulic pressure upon movement of the piston in one direction, a manually operable element for moving said block in one direction to move said pump piston against the influence of said spring and generate hydraulic pressure, said block having a third cylinder, a power piston therein movable in one direction by said hydraulic pressure, a spring to oppose such movement of said power piston and thereby store energy, and means including passages in said block and said pump piston to cause said hydraulic pressure generated by said pump piston to be applied initially to said power piston and thereafter in succession to and from said operating piston to close and permit opening of said jaws.

10. The machine set forth in claim 8 with the addition of means for predetermining and varying the duration of the period of application of said pressure to said operating piston.

11. The machine set forth in claim 9 with the addition of means for predetermining and varying the duration of the period of application of said pressure to said operating piston.

12. The machine defined in claim 8 with the addition of means for predetermining and varying the pressure applied to said operating piston.

13. The machine defined in claim 9 with the addition of means for varying tension of the second-mentioned spring to predetermine and vary the pressure applied to said operating piston.

14. A machine of the character described comprising relatively movable jaws to receive material between them to be pressed, and means for closing and opening said jaws including a hydraulic mechanism having a block mounted to move relatively to said jaws, an operating piston in said block operatively connected to said jaws, a pump piston mounted in said block to generate hydraulic pressure upon movement in one direction, a spring to actuate said pump piston in the other direction, a stationary abutment, a three-armed lever having an arm pivotally connected to said block and the other arms abutting said abutment and one end of said pump piston respectively so that said pump piston will be reciprocated to generate hydraulic pressure upon movement of said block in opposite directions, means for actuating said block, and means including said pump piston and passages in said block for controlling application and release of said pressure to and from said operating piston respectively.

15. A machine of the character described comprising relatively movable jaws to receive material between them to be pressed, and means for closing and opening said jaws including a manually operable element, and an operative connection between said manually operable element and said jaws which comprises a hydraulic mechanism including a means to produce hydraulic pressure, means for applying said hydraulic pressure to one of said jaws, an operative connection between the last-named means and said manually operable element such that movement of said manually operable element in one direction first manually closes said jaws, and means for controlling supply and release of said pressure to and from said pressure applying means to continue closing of said jaws under said pressure.

16. A machine of the character described comprising relatively movable jaws to receive material between them to be pressed, mechanism for closing said jaws and for opening the jaws after a predetermined period of time comprising a cylinder containing liquid, a piston reciprocable in said cylinder and operatively connected to one of said jaws, said piston having a passage communicating with said cylinder at opposite ends of said piston, and a valve in said passage to control the flow of liquid therethrough as said piston is moved in the direction to allow opening of said jaws.

17. The machine set forth in claim 2 with the addition of hydraulic means for predetermining the duration of the period of application of said hydraulic pressure to said jaws.

18. The machine set forth in claim 15 with the addition of means for predetermining the hydraulic pressure applied to said means for applying the hydraulic pressure.

19. In a machine of the character described, a frame, a pair of jaws, a yoke carrying at one end one of said jaws and pivotally mounted intermediate its ends on said frame, and mechanism for swinging said yoke to move the jaw thereon toward and from the other jaw to close the jaws, comprising a block pivoted on said frame on an axis parallel to the axis of said pivoted mounting of said yoke, a link pivotally connected to said block and to the end of said yoke opposite said jaw, and means for rocking said block in one direction to actuate said yoke and move said one jaw toward the other.

20. The machine set forth in claim 19 with the addition of a cylinder in said block and a piston in said cylinder, means for generating fluid pressure operated by rocking of said block in one direction, and means for controlling application of said pressure to said piston, and wherein said link is directly pivotally connected to said piston.

LEROY LINCOLN SALFISBERG.